(12) United States Patent
Henry et al.

(10) Patent No.: US 10,958,901 B2
(45) Date of Patent: Mar. 23, 2021

(54) METHODS AND DEVICES FOR CODING AND DECODING A DATA STREAM REPRESENTING AT LEAST ONE IMAGE

(71) Applicant: B-COM, Cesson Sevigne (FR)

(72) Inventors: Felix Henry, Saint Gregoire (FR); Joel Jung, Le Mesnil Saint Denis (FR); Charlene Mouton, Montgermont (FR)

(73) Assignee: B-COM, Cesson Sevigne (FR)

( * ) Notice: Subject to any disclaimer, the term of this patent is extended or adjusted under 35 U.S.C. 154(b) by 116 days.

(21) Appl. No.: 16/300,691

(22) PCT Filed: Apr. 27, 2017

(86) PCT No.: PCT/EP2017/060038
§ 371 (c)(1),
(2) Date: Nov. 12, 2018

(87) PCT Pub. No.: WO2017/194316
PCT Pub. Date: Nov. 16, 2017

(65) Prior Publication Data
US 2019/0208196 A1    Jul. 4, 2019

(30) Foreign Application Priority Data
May 10, 2016 (FR) .................................... 1654181

(51) Int. Cl.
*H04N 19/107* (2014.01)
*H04N 19/176* (2014.01)
(Continued)

(52) U.S. Cl.
CPC ......... *H04N 19/107* (2014.11); *G06K 9/6215* (2013.01); *H04N 19/11* (2014.11);
(Continued)

(58) Field of Classification Search
CPC .... G06K 9/6215; H04N 19/107; H04N 19/11; H04N 19/119; H04N 19/176; H04N 19/184
See application file for complete search history.

(56) References Cited

U.S. PATENT DOCUMENTS 6,259,736 B1 * 7/2001 Chujoh ................ H04N 19/503
375/240.13
6,567,469 B1 * 5/2003 Rackett ................ H04N 19/557
375/240.16
(Continued)

FOREIGN PATENT DOCUMENTS

AU    2015202844 A1    6/2015
AU    2015202844 A1    4/2018
(Continued)

OTHER PUBLICATIONS

Matthias Wein. "High Efficiency Video Coding, Coding Tools and Specification." Signals and Communication Technology, 2015.
(Continued)

*Primary Examiner* — Peter D Le
(74) *Attorney, Agent, or Firm* — David D. Brush; Westman, Champlin & Koehler, P.A.

(57) ABSTRACT

A method of decoding an encoded data stream representing at least one image subdivided into blocks. The method includes, for a current block of the image, and for each of at least two prediction modes available to predict the current block, obtaining a predictive block associated with the available mode; building a list having at least one of the available modes; for at least one mode included in the list, called a current mode, determining a distance measurement between the predictive block associated with the current mode and the other predictive blocks associated with the other available modes and obtained for the current block; modifying the list modified as a function of the determined
(Continued)

Figure 3B:
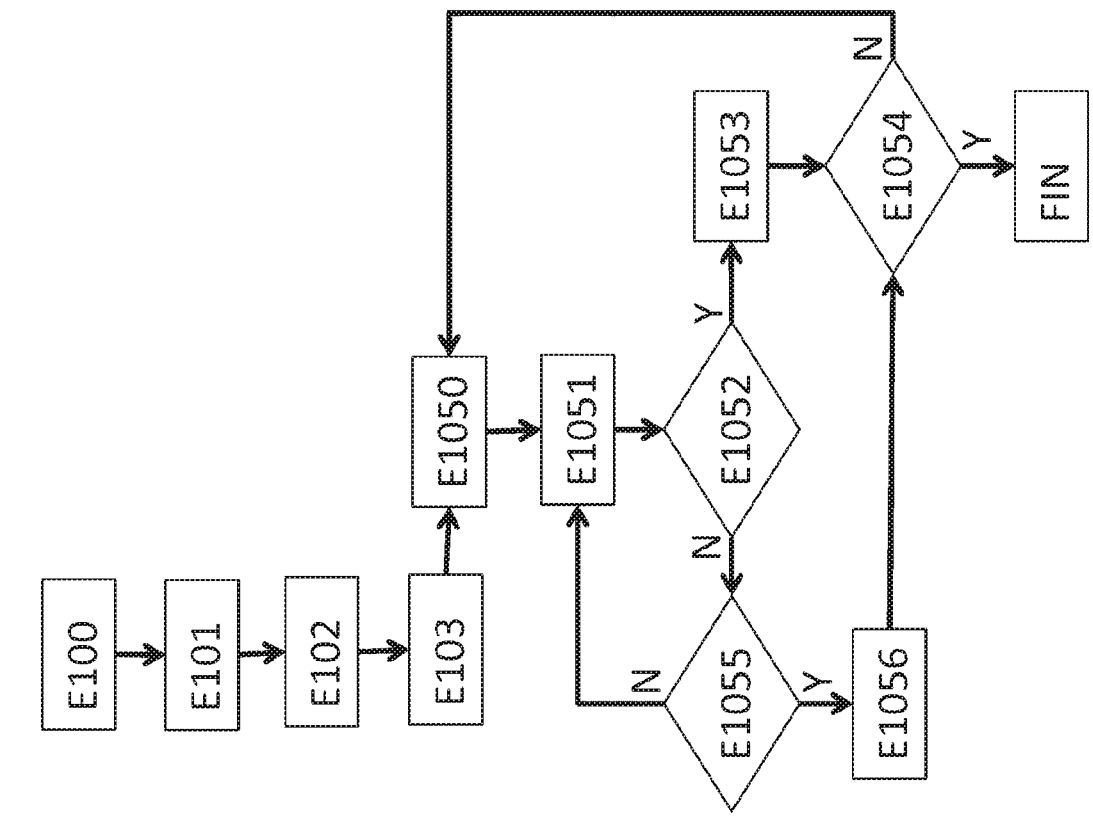

measurement; decoding information identifying, for the current block, a prediction mode from the modified list from the encoded data stream; and rebuilding the current block from the predictive block associated with the identified prediction mode.

19 Claims, 3 Drawing Sheets

(51) Int. Cl.
*H04N 19/11* (2014.01)
*H04N 19/119* (2014.01)
*H04N 19/184* (2014.01)
*G06K 9/62* (2006.01)

(52) U.S. Cl.
CPC ......... *H04N 19/119* (2014.11); *H04N 19/176* (2014.11); *H04N 19/184* (2014.11)

(56) References Cited

U.S. PATENT DOCUMENTS

| | | | | |
|---|---|---|---|---|
| 8,780,980 | B2* | 7/2014 | Yamaguchi | H03M 7/42 375/240.03 |
| 9,438,907 | B2* | 9/2016 | Kadoto | H04N 19/176 |
| 9,813,717 | B2* | 11/2017 | Matsunobu | H04N 19/13 |
| 9,955,169 | B2* | 4/2018 | Lee | H04N 19/70 |
| 2002/0039450 | A1* | 4/2002 | Kimoto | G06T 9/004 382/239 |
| 2005/0089094 | A1* | 4/2005 | Yoo | H04N 19/593 375/240.12 |
| 2005/0089235 | A1* | 4/2005 | Sakaguchi | H04N 19/146 382/239 |
| 2006/0056719 | A1* | 3/2006 | Yu | H04N 19/57 382/239 |
| 2006/0120450 | A1* | 6/2006 | Han | H04N 19/11 375/240.03 |
| 2006/0133502 | A1* | 6/2006 | Lee | H04N 19/107 375/240.16 |
| 2006/0182174 | A1* | 8/2006 | Kuo | H04N 19/176 375/240.03 |
| 2008/0175320 | A1* | 7/2008 | Sun | H04N 19/154 375/240.12 |
| 2011/0064325 | A1* | 3/2011 | Park | H04N 19/46 382/250 |
| 2011/0243229 | A1* | 10/2011 | Kim | H04N 19/147 375/240.13 |
| 2012/0082223 | A1* | 4/2012 | Karczewicz | H04N 19/11 375/240.12 |
| 2012/0177112 | A1* | 7/2012 | Guo | H04N 19/182 375/240.12 |
| 2012/0177118 | A1* | 7/2012 | Karczewicz | H04N 19/463 375/240.13 |
| 2012/0328009 | A1* | 12/2012 | Sasai | H04N 19/197 375/240.12 |
| 2013/0294510 | A1* | 11/2013 | Chono | H04N 19/154 375/240.12 |
| 2014/0133558 | A1* | 5/2014 | Seregin | H04N 19/137 375/240.12 |
| 2014/0219342 | A1* | 8/2014 | Yu | H04N 19/176 375/240.12 |
| 2016/0044310 | A1* | 2/2016 | Park | H04N 19/176 375/240.12 |
| 2016/0309145 | A1* | 10/2016 | Sunwoo | H04N 19/147 |
| 2017/0339404 | A1* | 11/2017 | Panusopone | H04N 19/107 |
| 2018/0184082 | A1* | 6/2018 | Yoo | H04N 19/176 |
| 2018/0324418 | A1* | 11/2018 | Koo | H04N 19/593 |

FOREIGN PATENT DOCUMENTS

| | | |
|---|---|---|
| EP | 2665269 A1 | 11/2013 |
| EP | 2723077 A1 | 4/2014 |

OTHER PUBLICATIONS

Li-Li Wang, Wan-Chi Siu. "Novel Adaptive Algorithm for Intra Prediction with Compromised Modes Skipping and Signaling Processes in HEVC." IEEE, 2013.
William H. Equitz. "A New Vector Quantization Clustering Algorithm." IEEE Transactions on Accoustics, Speech, Signal Processing, vol. 37, No. 10, pp. 1568-1575, Oct. 1989.
Detlev Marpe, Heiko Schwarz, Thomas Wiegand. "Context-based adaptive binary arithmetic coding in the H.264/AVC video compression standard." IEEE Transactions on Circuits and Systems for Video Technology, vol. 13, No. 7, pp. 620-636, Jul. 2003.
International Search Report dated Jul. 27, 2017, for corresponding International Application No. PCT/EP2017/060038, filed Apr. 27, 2017.
English translation of the International Written Opinion dated Aug. 14, 2017, for corresponding International Application No. PCT/EP2017/060038, filed Apr. 27, 2017.

* cited by examiner

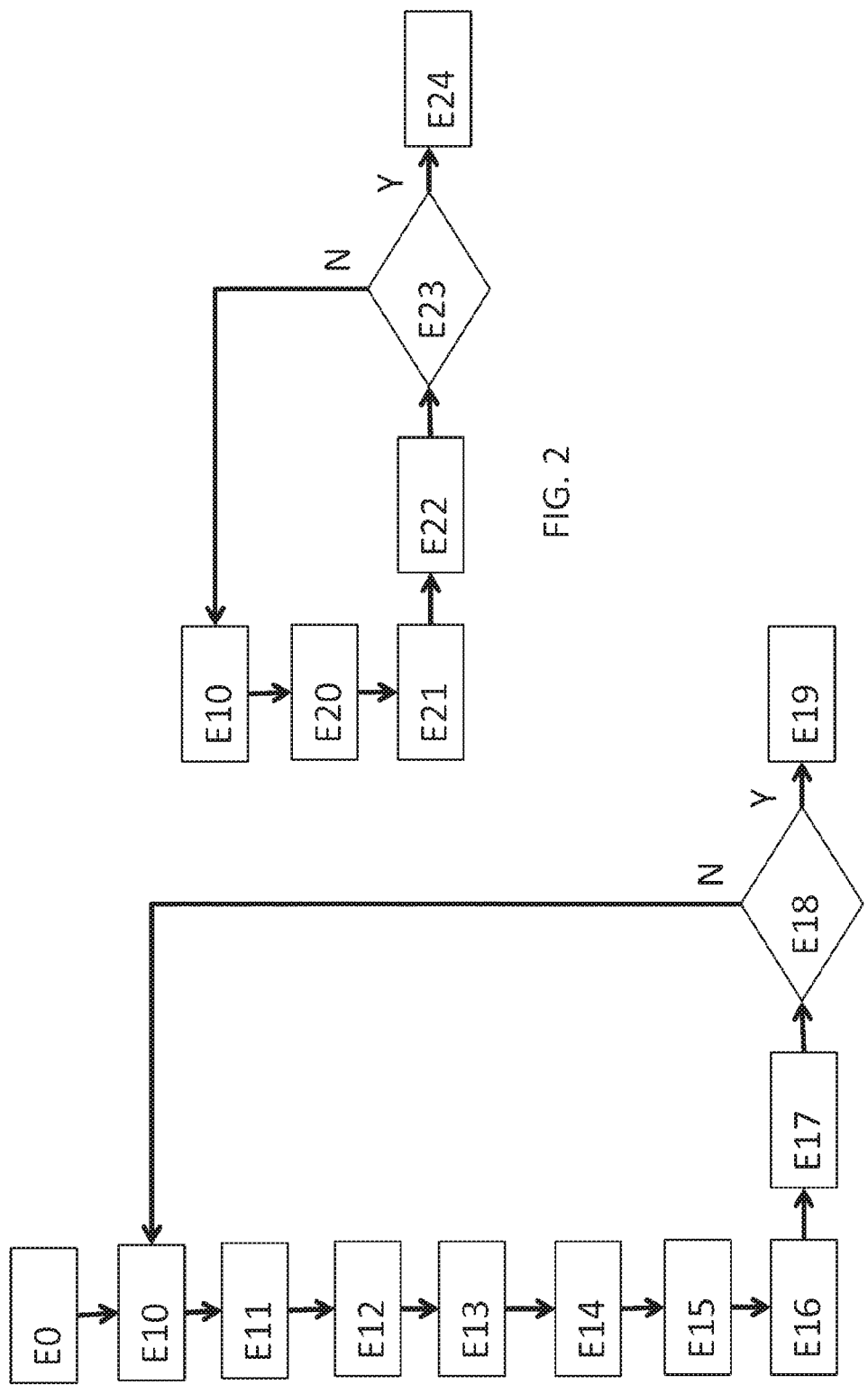

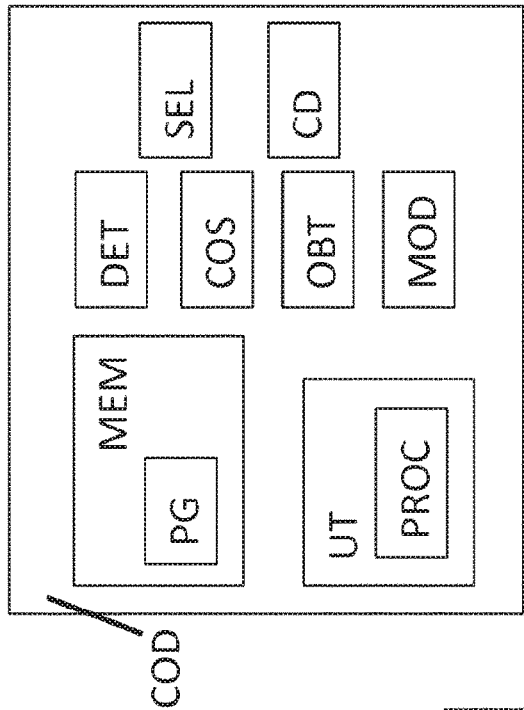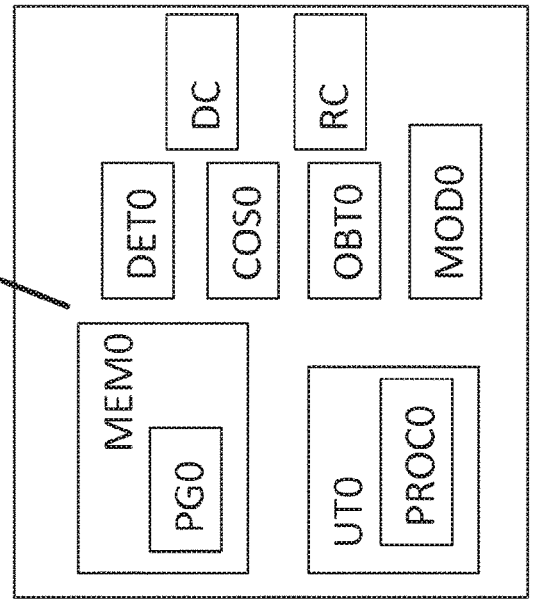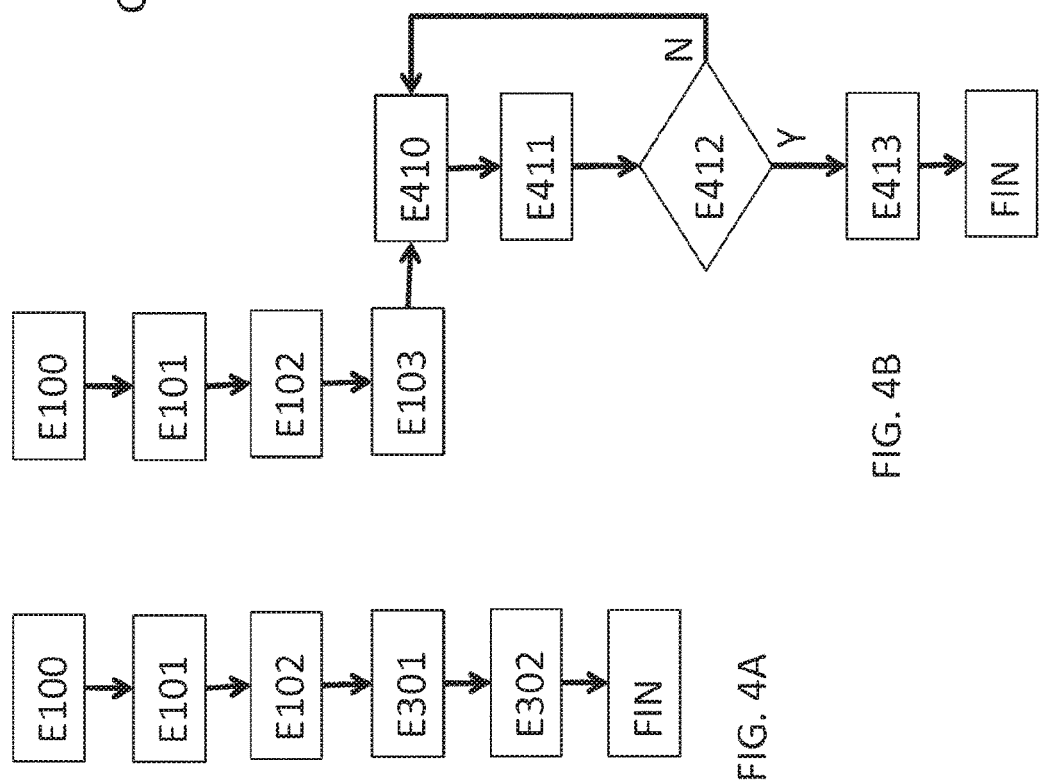

METHODS AND DEVICES FOR CODING AND DECODING A DATA STREAM REPRESENTING AT LEAST ONE IMAGE

CROSS-REFERENCE TO RELATED APPLICATIONS

This Application is a Section 371 National Stage Application of International Application No. PCT/EP2017/060038, filed Apr. 27, 2017, which is incorporated by reference in its entirety and published as WO 2017/194316 A1 on Nov. 16, 2017, not in English.

1. FIELD OF THE INVENTION

The field of the invention is that of the encoding and decoding of images or image sequences and especially video streams.

More specifically, the invention relates to the compression of images or image sequences using a block-based representation of the images.

The invention can be applied especially to image or video encoding implemented in current or future encoders (JPEG, MPEG, H.264, HEVC, etc. and their improvements) and to the corresponding decoding operations.

2. PRIOR ART

Digital images and image sequences take up a great deal of space in terms of memory and this makes it necessary to compress these images when they are transmitted in order to prevent problems of congestion in the network used for this transmission. The fact is that the bit rate that can be used on this network is generally limited.

Numerous video data compression techniques are already known. These include the HEVC ("High Efficiency Video Coding") compression standard described in Mathias Wien, High Efficiency Video Coding, Coding Tools and Specification", Signals and Communication Technology, 2015, which proposes to implement a prediction of pixels in a current image relative to other pixels belonging to the same image (intra prediction) or relative to a previous or following image (inter prediction).

More specifically, intra prediction exploits spatial redundancies within an image. To this end, the images are subdivided into blocks of pixels. The blocks of pixels are then predicted by means of already rebuilt information corresponding to the previously encoded/decoded blocks in the current image according to the order in which the blocks in the images are scanned.

Besides, classically, the encoding of a current block is carried out by means of a prediction of the current block, the prediction being called a predicted block, and a prediction residue or "residual block" corresponding to a difference between the current block and the predicted block. The residual bloc obtained is then transformed, for example by using a DCT (discrete cosine transform) type transform. The coefficients of the transformed residual block are then quantified, and then encoded by entropic encoding and transmitted to the decoder which can rebuild the current image by adding this residual block to the predicted block.

The decoding is done image by image and for each image it is done block by block. For each block, the corresponding elements of the stream are read. The inverse quantification and the inverse transformation of the coefficients of the residual block are carried out. Then, the prediction of the block is computed to obtain the predicted block and the current block is rebuilt by adding the prediction (the predicted block) to the decoded residual block.

In the HEVC standard, it is possible to make an intra prediction of a current block according to 35 different intra prediction modes. To encode the intra prediction mode selected to predict a current block, the HEVC standard defines two lists of prediction modes:

a first list called an MPM (most probable mode) list comprising the three intra prediction modes that are most probable for the current block, such an MPM list is defined on the basis of the prediction modes preliminarily selected during their encoding of the neighboring blocks of the current block, a second list called a non-MPM list comprising the 32 other remaining intra prediction modes, i.e. the intra prediction modes not included in the MPM list.

An index is transmitted to the decoder to indicate which MPM or non-MPM list is used to predict the current block. When the current block is encoded by an intra prediction mode from the MPM list, the index of the prediction mode selected in the MPM list is transmitted to the decoder by an entropic encoding. When the current block is encoded by an intra prediction mode of the non-MPM list, the index of the intra prediction mode selected in the non-MPM list is encoded by a code of a fixed five-bit length.

The non-MPM list comprises a large number of intra prediction modes, and the cost of encoding an index of a prediction mode of this list is therefore high.

L-L. Wang and W-C Siu, in "Novel Adaptive Algorithm for Intra Prediction with Compromised Modes Skipping and Signaling Processes in HEVC", IEEE, 2013, describe an encoding method by which it is possible to reduce the number of intra prediction modes used to predict a current block in order, firstly, to reduce the signaling cost of an intra prediction mode and, secondly, to reduce the complexity of selection of a prediction mode. For each current block, such a method builds a list comprising one, three or 35 intra prediction modes depending on the value of the variance of the reference pixels of the current block. The reference pixels of the current block correspond to the pixels of the row situated above the current block and the column situated to the right of the current block. A current block is then predicted by one of the prediction modes of the list. Such a method reduces the signaling cost of a prediction mode used to predict a current block by reducing the number of intra prediction modes available to predict a current block. It also accelerates the step of selection of an intra prediction mode to encode a current block because, depending on the size of the list of the prediction modes, not all the intra prediction modes are tested. This method takes the neighborhood of a current block as the basis to decide the prediction modes available for the current block. However, with such a method, some prediction modes are no longer available to predict the current block, and this may lead to a loss of precision of prediction and therefore to an increase in the cost of encoding the prediction residue.

There is therefore a need for a novel technique for encoding prediction modes to predict a current block making it possible to improve the compression of image or video data.

3. SUMMARY OF THE INVENTION

The invention seeks to improve the prior art. To this end, it proposes a method for decoding an encoded data stream representing at least one image, said image being subdivided into blocks, at least two prediction modes being available to predict a block, called a current block, of the image. Such a method for decoding comprises, for said current block, the following steps:

for each prediction mode available for predicting said current block, obtaining a predictive block associated with the available prediction mode, building a list comprising at least one of the two available prediction modes, for at least one prediction mode included in said list, called a current mode:

determining a measurement of distance between the predictive block associated with said current mode and the other predictive blocks associated with the other available prediction modes and obtained for said current block, modifying said list as a function of said determined measurement of distance, decoding, from the stream of encoded blocks, a piece of information identifying, for said current block, a prediction mode from the modified list, rebuilding said current block from the predictive block associated with said identified prediction mode.

The method for decoding according to the invention enables the decoding of a piece of information representing a prediction mode used to predict a block from a modified list of prediction modes. Advantageously, the list of prediction modes is adapted according to a determined measurement of distance for the predictive blocks delivered by the prediction modes of the list. Such an adaptation makes it possible to more efficiently organize the prediction modes of the list relative to one another as a function of the prediction that they provide.

The signaling cost of a prediction mode of the list for the current block, also called the cost of encoding a piece of information which, for said current block, identifies a prediction mode of the list, is thus optimized. Indeed, the list of prediction modes is adapted to similarities between the predictions given by these prediction modes. Such an adaptation makes it possible to optimize and reduce the cost of encoding a piece of information which, for said current block, identifies a prediction mode of the list.

The term "measurement of distance for a predictive block" herein designates a measurement of the difference between the prediction given by the predictive block and the prediction given by other predictive blocks. Such a measurement of distance quantifies the distance between the predictive blocks. Such a distance is all the greater as the predictions given by these blocks are different. It is thus possible to identify predictive blocks that are appreciably proximate to each other or very distant from each other and to adapt the list of prediction modes accordingly. The measurement of distance of a predictive block is determined relative to the prediction given by the predictive block, i.e. relative to the content of the predictive block. Thus, the list is adapted to the content of the prediction given and not estimated relative to a neighborhood of the current block as in the prior art. The list is therefore adapted with greater precision.

Advantageously, the list can include all the prediction modes available for a current block or only some of them, for example when certain prediction modes are included in a list other than the MPM list of the HEVC standard.

The invention also relates to a method for encoding at least one image in the form of a stream of encoded data, said image being subdivided into blocks, at least two prediction modes being available to predict a block of said image, called a current block. Such a method for encoding comprises the following steps, for said current block:

for each prediction mode available for predicting said current block, obtaining a predictive block associated with the available prediction mode, building a list comprising at least one of the two available prediction modes, for at least one prediction mode included in said list, called a current mode:

determining a measurement of distance between the predictive block associated with said current mode and the other predictive blocks associated with the other available prediction modes and obtained for said current block, modifying said list as a function of said determined measurement of distance, selecting, from the modified list, a prediction mode to encode the current block, encoding, in the data stream, a piece of information identifying, for said current block, said prediction mode selected in the modified list. The advantages of such a method for encoding are identical to those of the method for decoding.

The different modes or characteristics of the embodiments mentioned here above can be added, independently or in combination with one another, to the characteristics of the method for decoding and/or the method for encoding defined here above.

According to one particular embodiment of the invention, when the determined measurement of distance indicates that the predictive block is similar to a predictive block associated with another available prediction mode, the modification of the list corresponds to an elimination of said current mode from the list.

According to this particular embodiment of the invention, the number of prediction modes of the list is reduced when prediction modes deliver identical or appreciably proximate predictive blocks. Thus, when the index of a prediction mode in the list is encoded by a fixed-length code, then the number of bits needed to encode the index can be reduced.

According to one particular embodiment of the invention, the other available prediction mode is not included in said list. This particular embodiment of the invention thus enables the elimination, from the list, of those modes of prediction that give a prediction similar to the prediction of a mode of prediction not included in the list. For example, such a prediction mode not included in the list is a previously coded prediction mode, such as the MPM mode of the H.264/AVC or the MPM list of the HEVC standard. This particular embodiment enables the elimination, from the list, of the prediction modes redundant with other modes already encoded.

According to one particular embodiment of the invention, the measurement of distance for a first predictive block is determined by a computation of a mean squared error computed between said first predictive block and a second predictive block, said first predictive block being similar to said second predictive block when the mean squared error computed is below a predetermined threshold. This particular embodiment of the invention modifies the list of prediction modes by comparing the mean squared error between the predictive blocks with a predetermined threshold. Thus, it is possible to identify whether the predictive blocks are proximate or distant.

According to another particular embodiment of the invention, the predetermined threshold varies with the size of the current block. Indeed, the greater the current block, the more capable it is of containing a large quantity of pieces of information.

According to another particular embodiment of the invention, the steps for determining a measurement of distance of a predictive block associated with a prediction mode from the list and for modifying said list as a function of the determined measurement of distance are iterated so that the modified list includes a number of prediction modes equal to $2^N$, N being a number of bits on which an index of the list is encoded. This particular embodiment of the invention optimizes the number of prediction modes available to predict the current block and the signaling cost associated with these prediction modes when a prediction mode is signaled by a fixed-length encoding.

According to another particular embodiment of the invention, the modification of the list corresponds to a re-ordering of the list, wherein the prediction modes of the list are ordered according to a descending order of the measurement of distance determined for each prediction mode of the list. Thus, such a re-ordering optimizes the encoding of a distance of such a list through an encoding by variable-length codes.

According to another particular embodiment of the invention, the measurement of distance for each prediction mode included in the list is determined by a computation of the energy of the predictive block associated with said prediction mode and obtained for said current mode. According to this particular embodiment of the invention, the predictive blocks comprising the greatest number of pieces of information are placed at the beginning of the list.

According to another particular embodiment of the invention, the measurement of distance is determined by a computation of the Euclidean distance between the predictive block and another predictive block associated with another prediction mode. Thus, when the list is re-ordered, the predictive blocks that are at the greatest distance from the other predictive blocks available are placed at the beginning of the list. Thus, the prediction modes delivering the predictive blocks that are most different are placed at the beginning of the list. It is thus possible to propose a greater number of varieties in the predictive blocks for the indices of the list with low encoding cost.

According to another particular embodiment of the invention, the type of modification of the list (elimination of prediction modes or re-ordering of the prediction modes) is determined according to the type of encoding of said image. According to this particular embodiment of the invention, the complexity of the decoding can be adapted to the type of image to be decoded.

The invention also relates to a decoding device adapted to implementing the method for decoding according to any one of the particular embodiments defined here above. This decoding device could of course include the different characteristics pertaining to the method for decoding according to the invention. Thus, the characteristics and advantages of this decoding device are the same as those of the method for decoding and are not described in more ample detail.

According to one particular embodiment of the invention, such a decoding device is included in a terminal.

The invention also relates to an encoding device adapted to implementing the method for encoding according to any one of the particular embodiments defined here above. This encoding device could of course include the different characteristics pertaining to the method for encoding according to the invention. Thus, the characteristics and advantages of this encoding device are the same as those of the method for encoding and are not described in more ample detail.

According to one particular embodiment of the invention, such an encoding device is included in a terminal or a server.

The method for decoding and the method for encoding respectively, according to the invention, can be implemented in various ways in wired form or in software form.

According to one particular embodiment of the invention, the method for decoding and the method for encoding respectively are implemented by a computer program. The invention also relates to a computer program comprising instructions to implement the method for decoding or the method for encoding according to any one of the embodiments described here above when said program is executed by a processor. Such a program can use any programming language whatsoever. It can be downloaded from a communications network and/or stored on a computer-readable medium.

This program can use any programming language whatsoever and be in the form of source code, object code or intermediate code between source code and object code such as in a partially compiled form or in any other desirable form whatsoever.

The invention is also aimed at providing a recording medium or information medium readable by a computer and comprising instructions of a program as mentioned here above. The recording media mentioned here above can be any entity or device whatsoever capable of storing the program. For example, the medium can comprise a storage means such as a ROM, for example, a CD ROM or a microelectronic circuit ROM or again a magnetic recording means, for example a floppy disk or a hard disk drive. Furthermore, the recording medium can be a transmissible medium such as an electrical or optical signal that can be conveyed via an electrical or optical cable, by radio or by other means. The program according to the proposed technique can especially be uploaded to an Internet type network.

As an alternative, the recording media can correspond to an integrated circuit into which the program is incorporated, the circuit being adapted to executing or to being used in the execution of the method in question.

4. LIST OF FIGURES

Figure 3A:
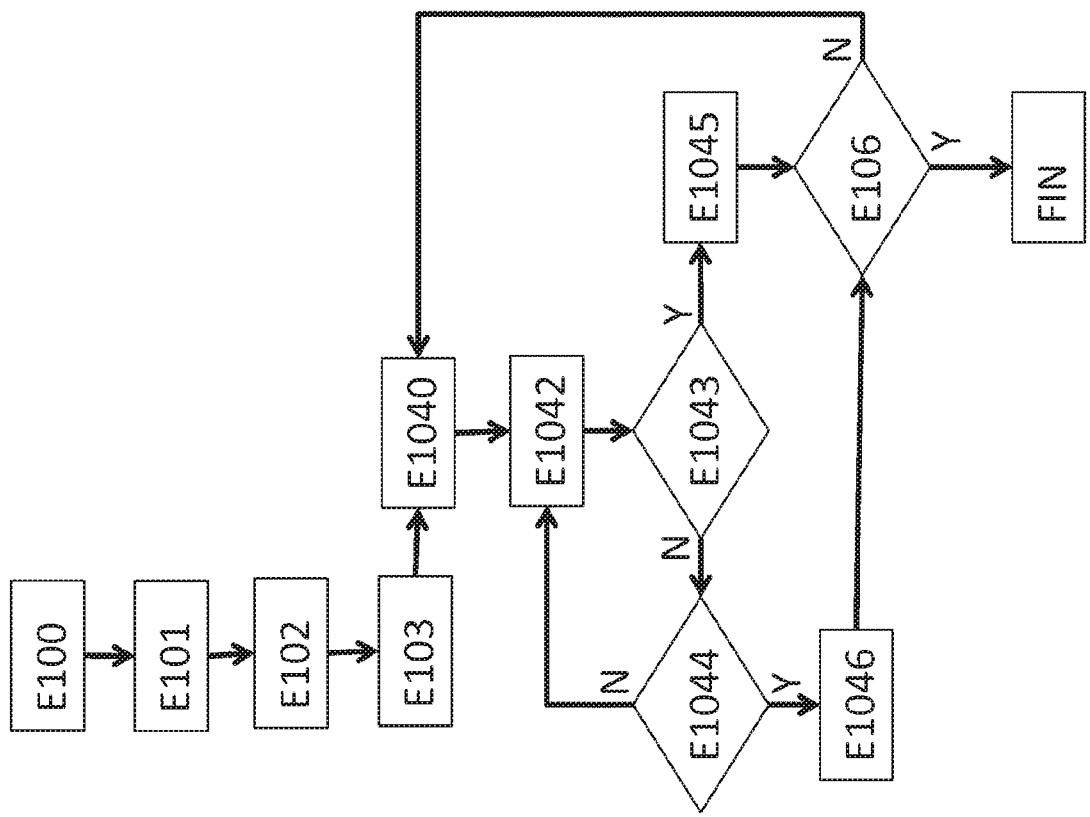

Other features and advantages of the invention shall appear more clearly from the following description of a particular embodiment given by way of a simple, illustratory and non-exhaustive example and from the appended figures, of which:

FIG. 1 presents the steps of the method for encoding according to one particular embodiment of the invention, FIG. 2 presents the steps of the method for decoding according to one particular embodiment of the invention, FIGS. 3A, 3B illustrate the main steps for modifying a list of prediction modes used in the methods for encoding and decoding according to the invention, according to different particular embodiments of the invention, FIGS. 4A and 4B illustrate the main steps for modifying a list of prediction modes used in the methods for encoding and decoding according to the invention, according to other particular embodiments of the invention, FIG. 5 presents the simplified structure of an encoding device adapted to implementing the method for encoding according to any one of the particular embodiments of the invention, FIG. 6 presents the simplified structure of a decoding device adapted to implementing the method for decoding according to any one of the particular embodiments of the invention.

5. DESCRIPTION OF ONE EMBODIMENT OF THE INVENTION

5.1 General Principle

The general principle of the invention is aimed at improving the signaling cost of a prediction mode used to predict a block of pixels of an image to be encoded. Present-day compression standards propose a large number of prediction modes to encode a block in order to provide the closest possible prediction of the pixels of the block to be encoded. Thus, the prediction residue quantified is small or even zero, and this reduces the cost of encoding the prediction residue. However, the signaling cost of a prediction mode increases with the number of prediction modes possible. Now, it can be seen, in certain cases, that prediction modes provide predictions, i.e. predicted blocks that are very close to one another. Thus, certain prediction modes are not always necessary from a bit rate/distortion viewpoint. The invention seeks to adapt the number of prediction modes available to predict and encode a block of an image in order to reduce the signaling cost of the prediction modes.

To this end, a list L of prediction modes is created and modified as a function of a measurement of distance determined relative to the content of at least one predictive block associated with a prediction mode of the list L. Such a measurement of distance corresponds to the computed distance between a prediction provided by a prediction mode from such a list and a prediction provided by another prediction mode that belongs or does not belong to the list, depending on the embodiment.

We shall first of all present modes of carrying out the creation and modification of such a list, and then present a method for encoding and a method for decoding according to the invention using such a modified list.

5.2 Creation and Modification of the List of Prediction Modes

Here below, referring to FIGS. 3A, 3B, 4A, 4B we present variants of implementation to create and modify a list L of prediction modes. The invention is herein described in the context of an application to the intra prediction modes defined in the HEVC standard. The invention can easily be applied to other compression standards and other prediction modes.

It may be recalled that the HEVC standard defines 35 intra prediction modes:
- a planar mode (mode 0), this mode consists in linearly interpolating the pixels of the predictive block (or predicted block) on the basis of the reference pixels; the reference pixels being built out of previously rebuilt neighboring blocks,
- a DC mode (mode 1), this mode consists in assigning, to the pixels of the predictive block, the same value corresponding to an average of the reference pixels,
- 33 A(0)-A(32) angular modes, such modes form a predictive block by the extension of the reference pixels of the current block in one of the 33 associated directions.

Here below, we present different modes of implementing a step (E10) for creating and modifying the list of prediction modes used in the encoding method according to the invention described with reference to FIG. 1B and in the decoding method according to the invention described with reference to FIG. 2B.

5.2.1 First Mode of Implementation

In the example illustrated in FIG. 3A, the modification of the list L of prediction modes corresponds to an elimination, from the list L, of the prediction modes that provide a prediction similar to that of other prediction modes already present in the list L.

At a step E100, the intra prediction modes available to predict a current block $b_c$ of an image to be encoded/decoded are determined. Depending on the position of the current block $b_c$, it can be the case that certain prediction modes are unavailable. For example, if the block $b_c$ is a block of the first row of the image, the prediction modes using the reference pixels of the neighboring block situated above the current block and of the block situated above and to the left of the current block are not available. If the block $b_c$ is a block of the first column of the image, the prediction modes using the reference pixels of the neighboring block situated to the left of the current block and of the block situated above and to the left of the current block are not available. In the embodiment described here, the number n of available prediction modes is considered to be equal to 35.

At a step E101, a predictive block P[K] is computed for each prediction mode K available for the current block $b_c$. The predictive blocks are obtained by applying the corresponding prediction to the prediction mode K (planar, DC or one of the angular modes A(0)-A(32)). A predictive block P[K] is therefore a block of pixels having the same size as the current block $b_c$ and comprising a prediction given by the predictive block K.

At a step E102, the list L of prediction modes is built out of the prediction modes available for the current block. This list L corresponds for example to a list of prediction modes called a non-MPM list in the HEVC standard.

The non-MPM list is built out of the remaining intra prediction modes not included in a list known as an MPM list.

According to the HEVC standard, the MPM list comprises three of the most probable intra prediction modes to encode the current block. Mtop and Mleft designate the prediction modes associated with the blocks situated respectively above and to the left of the current block, these blocks having been preliminarily encoded/decoded. If one of the blocks is not encoded according to an intra prediction mode, the mode DC is assigned to it.

If Mtop and Mleft are both equal to a same prediction mode and if this prediction mode is the DC or planar prediction mode, then the list MPM comprises the following prediction modes: MPM[0]=PLANAR, MPM[1]=DC, MPM[2]=A(26).

If Mtop and Mleft are both equal to a same angular prediction mode m(n), the list MPM comprises the following prediction modes: MPM[0]=m(n), MPM[1]=m(2+(n+29)mod32), MPM[2]=m(2+(n−1)mod32).

If Mtop and Mleft are different, the list MPM comprises the following prediction modes:
MPM[0]=Mleft, MPM[1]=Mtop, MPM[2]=Mlast, where Mlast is defined as follows:
  if Mleft is not equal to the PLANAR mode and Mtop is not equal to the planar mode, then Mlast is equal to the planar mode,
  else, if Mleft is not equal to the DC mode and Mtop is not equal to the DC mode, then Mlast is equal to the DC mode, else, Mlast is equal to the angular mode A(26).

At the step E102, when the list MPM is built, the list L is built by adding all the intra prediction modes available for the current block and not included in the MPM list. In the embodiment described here, the list L comprises a number $N_L$ of 32 prediction modes.

According to other variants of embodiments of the invention, the list L can be built according to other criteria, for example by adding all the intra prediction modes available or again by adding all the intra prediction modes available except one intra prediction mode called MPM as defined by the H.264/AVC standard. The invention seeks to improve the encoding of the list L whether it contains all available prediction modes or only certain of them.

At a step E103, a variable i is reset at 0. This variable i is used to scroll through all the prediction modes included in the list L.

For each prediction mode L[i] of the list, it is determined whether the prediction mode L[i] gives a prediction similar to another prediction mode of this list L. To this end, a second scrolling is done on the list L by means of the variable j ranging from the value i+1 à $N_L$-1. At a step E1040, the variable j is therefore reset at the value i+1. A measurement of distance between the predictive block P(L[i]) associated with the prediction mode L[i] and another predictive block P(L[j]) associated with the prediction mode L[j] is determined at a step E1042.

According to the mode of implementation described here, the measurement of distance is determined by a computation of a mean squared error computed from the pixels of the predictive block P(L[i]) and the pixels of the predictive block P(L[j]). At a step E1043, a test is carried out to ascertain whether the mean squared error determined at the step E1042 is below a predetermined threshold T1. Should the mean squared error be below a threshold T1 (Y for Yes), the prediction mode L[i] is eliminated from the list L (step E1045) and the number $N_L$ of prediction modes of the list L is therefore reduced by 1. During the elimination from the list L of the prediction mode L[i], all the prediction modes of the list L situated after the index i in the list are raised by one level. Then, the operation passes to the step E106.

At the step E1043, should the mean squared error be greater than or equal to the threshold T1 (N for No), the operation passes to the step E1044.

At the step E1044, j is increased by 1 and a check is made as to whether j is greater than or equal to $N_L$. In other words, a check is made as to whether all the prediction modes of the list L placed after the prediction mode L[i] have been scrolled through during the second loop. If the answer is 'No', the method is resumed at the step E1042.

If the answer is 'Yes', the method passes to the step E1046 during which the variable i is increased by 1 to pass to the next prediction mode in the list L. Then the method passes to the step E106.

At the step E106, a check is made as to whether all the prediction modes of the list L have been scrolled through during the first loop. In other words, a test is made as to whether i is greater than or equal to $N_L$-1. If the result of the test E106 is 'Yes', the method for modifying the list L is terminated. If the result of the test E106 is 'No', the method returns to the step E1040 to verify the similarity of the prediction of the next prediction mode with the other prediction modes of the list L.

5.2.2 Second Mode of Implementation

According to the example illustrated in FIG. 3B, the modification of the list L of the prediction modes corresponds to an elimination, from the list L, of the prediction modes that give a prediction similar to the other prediction modes not included in the list L. For example, these other prediction modes not included in the list L are prediction modes of the MPM list of the HEVC standard.

The steps E100 to E103 of FIG. 3B are identical to those described with reference to FIG. 3A.

In this mode of implementation, for each prediction mode L[i] of the list L, it is determined whether the prediction mode L[i] gives a prediction similar to another prediction mode of the list MPM. To this end, the list MPM is scrolled through by means of the variable j ranging from the value 0 to $N_m$-1, where $N_m$ corresponds to the number of prediction modes included in the MPM list. At a step E1050, the variable j is therefore reset at the value 0. A measurement of distance of the predictive block P(L[i]) associated with the prediction mode L[i] relative to another predictive block P(MPM[j]) associated with the prediction mode MPM[j] is determined at a step E1051.

Depending on the mode of implementation described here, the measurement of distance is determined by a computation of a mean squared error computed from the pixels of the predictive block P(L[i]) and pixels of the predictive block P(MPM[j]). At a step E1052, a test is made as to whether the mean squared error determined at the step E1051 is smaller than a predetermined threshold T2. Should the mean squared error be below the threshold T2, the prediction mode L[i] is eliminated from the list L (step E1053) and the number $N_L$ of prediction modes of the list L is therefore reduced by 1. During the elimination from the list L of the prediction mode L[i], all the prediction modes of the list L situated after the index i in the list are raised by one level. The method then passes to the step E1054.

At the step E1052, should the mean squared error be greater than or equal to the threshold T2, the method passes to the step E1055.

At the step E1055, j is increased by 1 and a verification is made as to whether j is greater than or equal to $N_M$. In other words, a verification is made as to whether all the prediction modes of the MPM list have been scrolled through during the second loop. If the answer is 'No', the method resumes at the step E1051.

If the answer is 'Yes', the method passes to the step E1056 during which the variable i is increased by 1 to pass to the next prediction mode in the list L. Then, the method passes to the step E1054.

At the step E1054, i a verification is made as to whether the prediction modes of the list L have been scrolled through during the first loop. In other words, a verification is made as to whether i is greater than or equal to $N_L$. If the result of the test E1054 is 'Yes', the step of modification of the list L is terminated. If not, the method resumes at the step E1050 to verify the similarity of the prediction of the next prediction mode in the list L with the prediction of each of the prediction modes of the MPM list.

In order to optimize the signaling cost of a prediction mode of the modified list L, it is possible to apply, in succession, the modification of the list illustrated in FIG. 3B and then the modification of the list illustrated in FIG. 3A.

According to one variant of an implementation, the thresholds T1 and T2 can vary according to context. For example, the threshold T1 and/or T2 can vary with the size of the current block $b_c$. Thus, if the threshold T1 is defined for blocks sized 4×4 pixels, the threshold will then be 4*T1 for blocks sized 8×8 pixels, the threshold will then be 16*T1 for blocks sized 16×16 pixels, and the threshold will then be 64*T1 for blocks sized 32×32 pixels.

According to another variant of implementation, it is possible to use a criterion other than the mean squared error as the criterion of similarity between two predictive blocks. For example, the Euclidean distance between two predictive blocks or other measurements of distance between two blocks of pixels can be used.

5.2.3 Third Mode of Implementation

According to the example illustrated in FIG. 4A, the modification of the list L of the prediction modes corresponds to a sorting of the list L of the prediction modes according to a determined criterion relative to the content of the predictive blocks associated with the prediction modes of the list.

According to this mode of implementation, the steps E100-E102 of FIG. 4A are identical to those described with reference to FIG. 3A.

In a step E301, the energy E(L[i]) of a predictive block P(L[i])) associated with a prediction mode L[i] of the list L is computed for each prediction mode L[i]. The E(L[i]) of a predictive block P(L[i])) is computed from the value of the pixels of the predictive block.

At a step E302, the list L is sorted so as to classify the prediction modes of the list according to a descending order of energy E(L[i]).

Advantageously, this particular embodiment optimizes the encoding of the index in providing predictions in giving the greatest amount of information at the beginning of the list L.

5.2.4 Fourth Mode of Implementation

According to the example illustrated in FIG. 4B, the modification of the list L if the prediction modes corresponds to a sorting of the list L of the prediction modes as a function of a determined criterion relative to the content of the predictive blocks associated with the prediction modes of the list. In the exemplary embodiment described herein, the criterion corresponds to a distance between the blocks.

According to this mode of implementation, the steps E100-E103 of FIG. 4B are identical to those described with reference to FIG. 3A. The distance of a predictive block from another predictive block is computed and saved in a table T in association with the prediction modes for which it has been computed. Initially the table T is empty.

Following the step E103 for resetting the variable i at the value 0, a distance between the predictive block P(L[i]) and each predictive block P(L[k]), k ranging from 0 to $N_L$, is computed during a step E410. For example, such a distance is computed by the Euclidean distance between a vector comprising the values of the pixels of the predictive block P(L[i]) and a vector comprising the values of the pixels of the predictive block P(L[k]). The distances computed for the predictive block P(L[i]) are saved in the table T in descending order of distance.

During a step E411, the variable i is incremented by 1 to pass to the next prediction mode in the list L. During a step E412, a verification is made as to whether all the prediction modes of the list L have been traversed. In other words, a test is made during the step E412 as to whether i is greater than or equal to $N_L$. If this is so, then the method passes to the step E413. If not, the method resumes at the step E410 to process the next prediction mode in the list L.

At the step E413, the list L is updated by a sorting of the prediction modes L[i] so that the list L has prediction modes L[i] in descending order of distances between the predictive blocks saved in the table T. In other words, after sorting by descending values of distance, the list L presents the prediction modes from those most distant to the other modes to those closest to the other modes. Such a mode of implementation makes it possible, at the beginning of the list, to propose the most distant prediction modes and therefore the most different possible predictions associated with the lowest encoding cost in the case of an encoding of the prediction mode according to a variable-length code.

As an alternative, this mode of implementation can use a criterion other than the Euclidean distance between two predictive blocks to sort out the list L. For example, it is possible to sort the list L in descending order of the mean squared error computed between two predictive blocks.

5.2.5 Alternative Embodiments

The alternative embodiments presented here above can be applied independently or in combination with one another to any one of the particular embodiments of implementation presented here above.

5.2.5.1 Control of the Size of the List L

According to one alternative embodiment, when the list L is modified by elimination, its size is checked so as to optimize the number of prediction modes included in the list L relative to its encoding cost.

According to this variant, at the resetting step E103, the list L is saved in a temporary list $L_t$. When the list L is modified during the step E1045 of FIG. 3A or E1053 of FIG. 3B, a verification is made as to whether the number $N_L$ of prediction modes included in the modified list L is an integer power of 2. In other words, a verification is made as to whether $N_L$ can be written in the form $2^b$ where b is an integer and represents the number of bits needed for the encoding of an index of the list. If $N_L$ is an integer power of 2, the modified list L is saved in the temporary list $L_t$.

At the end of the modification steps of the list L, i.e. after the step E106 of FIG. 3A or E1054 of FIG. 3B, the list L is replaced by the temporary list $L_t$. The temporary list $L_t$ comprises the last modified list L, the number of prediction modes of which is a power of 2.

Thus, the reduction of the number of prediction modes of the list is optimized relative to the encoding cost of a prediction mode of this list.

5.2.5.2 Contextual Matching

The method of modification (elimination of prediction modes, or sorting) of the list L can depend on the type of image to be decoded/encoded to which the current block $b_c$ belongs. For example, a current block belonging to an intra type image, L could be modified through a sorting operation as described with reference to FIG. 4A or 4B because such a method is less computation intensive. For an inter type image, the list L could be modified through the elimination of the redundant prediction modes as described with reference to FIG. 3A or 3B.

5.2.5.3 Other Methods of Elimination of Similar Blocks from the List L

As a variant, the elimination from the list L of a prediction mode giving a prediction similar to another prediction mode can be carried out through a 'Pairwise Nearest Neighbor' type algorithm described in W. H. Equitz, "A New Vector Quantization Clustering Algorithm", IEEE Transactions on Accoustics, Speech, Signal Process, 37-10, pp 1568-1575, 1989.

5.3 Encoding Method

FIG. 1 presents steps of the method for encoding a sequence of images $I_1, I_2, \ldots, I_N$ to be encoded in the form of a encoded data stream STR according to one particular embodiment of the invention. For example, such an encoding method is implemented by an encoding device as described with reference to FIG. 5. A sequence of images $I_1, I_2, \ldots, I_N$ to be encoded is given at input of the encoding method. The encoding method outputs an encoded data stream STR representing the sequence of images provided at input.

In a known way, the sequence of images $I_1, I_2, \ldots, I_N$ is encoded image by image in an encoding order that is pre-established and known to the decoder. For example, the images can be encoded in the temporal order $I_1, I_2, \ldots, I_N$ or in another order, for example $I_1, I_3, I_2, \ldots, I_N$. xxx At a step E0, an image $I_k$ to be encoded of the sequence of images $I_1, I_2, \ldots, I_N$ is subdivided into blocks of maximum size. Each maximum-sized block can be re-subdivided into smaller blocks. For example, a maximum-sized block has a size of 32×32 pixels. Such a maximum-sized block can be subdivided into square or rectangular sub-blocks, for example sized 16×16, 8×8, 4×4, 16×8, 8×16, etc. Then, at the step E0, a block $b_c$ to be encoded of an image $I_k$ is selected according to a predetermined scanning order of the image $I_k$.

At a step E10, a list L of prediction modes to encode the current block $b_c$ is created and modified. The step E10 for creating and modifying the list L comprises a set of sub-steps which are described here above according to different embodiments of the invention with reference to FIGS. 3A, 3B, 4A and 4B.

Once the list L of created prediction modes is modified, at a step E11, a prediction mode to encode the current block $b_c$ is selected from among the prediction modes of the list L. For example a prediction mode giving the best tradeoff between bit rate and distortion for the current block is selected.

At a step E12, a piece of information identifying the selected prediction mode is encoded in an encoded data stream STR for the current block $b_c$. For example, such a piece of information is encoded in the stream in the form of an index idx encoded by a fixed-length or variable-length code.

At a step E13, a prediction residue RES is computed from the current block $b_c$ and the predictive block P(L[idx]) associated with the prediction mode selected at the step E11. The prediction residue RES is obtained by the difference between the current block to be encoded $b_c$ and the predictive block P(L[idx]).

At a step E14, in a known way, the prediction residue RES is then transformed, for example by a DCT transform, and quantified. Coefficients of quantified transform residues are then obtained.

At a step E15, the coefficients of quantified transform residues are then encoded in the form of an encoded data stream STR. This encoding is done by an entropic encoding module, for example a CABAC encoder described in D. Marpe, H. Schwarz, T. Wiegand, "Context-based adaptive binary arithmetic coding in the H.264/AVC video compression standard", IEEE Transactions on Circuits and Systems for Video Technology (Volume: 13, Issue: 7), pages 620-636, July 2003. During the step E15, a piece of information identifying the prediction mode selected at the step E11 is encoded in the encoded data stream STR for the current block $b_c$. For example, such a piece of information is encoded in the stream in the form of an index idx encoded by a fixed-length or variable-length code.

At a step E16, a prediction residue RES' is reconstituted by applying an inverse quantification and an inverse transformation to the quantified transformed coefficients. At a step E17, a block of pixels REC is rebuilt by adding the rebuilt prediction residue RES' to the predictive block P(L[idx]) associated with the prediction mode selected at the step E11.

At a step E18, a verification is made as to whether all the blocks of the image to be encoded have been encoded. If the answer is 'No', the encoding method returns to the step E10 by proceeding to the next block according to a predetermined scanning order of the image to be encoded.

Should all the blocks of the image have been processed, at a step E19, an image $I_k^{rec}$ is reconstituted from the rebuilt blocks REC of the image and saved in a list of reference images to be used subsequently as a reference during the encoding of the following images of the sequence of images.

5.4 Decoding Method

FIG. 2 presents the steps of a method for decoding an STR data stream of encoded data representing a sequence of images $I_1, I_2, \ldots, I_N$ to be decoded according to a particular embodiment of the invention.

For example, the data stream STR has been generated through the encoding method presented with reference to FIG. 1. The data stream STR is provided at the input of a decoding device DEC as described with reference to FIG. 6.

The decoding method carries out the decoding of the stream image by image. For each image to be decoded, the decoding method carries out the decoding of the image block by block.

For a block $b_c$ of an image to be rebuilt at a step E10, a list L of prediction modes associated with the current block $b_c$ is created and modified according to a particular embodiment identical to the embodiment used during the encoding of the data stream STR. The step E10 for creating and modifying the list L comprises a set of sub-steps that have been described here above according to different embodiments of the invention with reference to FIGS. 3A, 3B, 4A and 4B.

At a step E20, the data of the data stream STR corresponding to the block $b_c$ are decoded by an entropic decoding module to give, on the one hand, syntax elements relating to the encoding mode (or prediction mode) of the current block $b_c$ and, on the other hand, a group of coefficients of prediction residues of the current block $b_c$. The decoded syntax elements comprise especially a piece of information on prediction mode identifying, for the current block $b_c$, one prediction mode among the prediction modes of the list L of prediction modes. For example, such a piece of information is encoded in the stream in the form of an index idx of the list L.

At a step E21, the coefficients of prediction residues of the block $b_c$ undergo an inverse quantification and then an inverse transformation to deliver a decoded prediction residue RES'. At a step E22, the current block $b_c$ is rebuilt from the predictive block P(L[idx]) associated with the prediction mode L[idx] of the list and the prediction residue RES' associated with the current block $b_c$ that has been decoded from the encoded data stream STR. The predictive block P(L[idx]) has been computed previously at the step E10. A rebuilt block REC for the current block $b_c$ is therefore obtained by adding the predictive block P(L[idx]) to the decoded prediction residue RES'. At a step E23, a verification is made as to whether all the blocks of the image to be decoded have been decoded and rebuilt. If the case is 'No', the decoding method returns to the step E10 in proceeding to the next block according to a predetermined scanning order of the image to be decoded.

Should all the blocks of the image have been processed, at a step E24, an image $I_k^{rec}$ is rebuilt from the reconstituted blocks REC and saved in a list of reference images to be used subsequently as references during the decoding of the next images of the sequence of images.

The methods of encoding and decoding described here above can be integrated into standard video encoders/decoders such as H.266, HEVC/H.265, AVC/H.264 or any type of proprietary video encoder/decoder. The methods of encoding and decoding according to the invention can also be applied to all types of encoders/decoders of fixed images and more generally of signals using a predictive encoding by means of several available prediction modes.

The methods of encoding and decoding have been described here above in the case of a spatial block-based encoding (intra encoding). These methods can easily be applied to the case of encoding of a block according to other modes of encoding, inter encoding for example. The list of prediction modes built can thus include different types of modes of encoding (intra, inter, inter-layer, etc.).

5.5 Encoding Device

FIG. 5 presents the simplified structure of an encoding device adapted to implementing the encoding method according to any one of the particular embodiments of the invention. The encoding device COD is adapted to encoding at least one image in the form of an encoded data stream, said image being sub-divided into blocks, at least two prediction modes being available to predict a block of said image, called a current block.

The encoding device COD is especially configured to:
 obtain, for each prediction mode available for predicting said current block, a predictive block associated with the available prediction mode,
 build a list comprising at least one of the two available prediction modes,
 for at least one prediction mode included in said list, called a current mode:
  determine a measurement of distance between the predictive block associated with said current mode and the other predictive blocks obtained,
  modify said list as a function of said determined measurement of distance,
  select, from among the modified list, a prediction mode to encode the current block,
  encode, in the list of data, a piece of information identifying, for said current block, said prediction mode selected in the modified list.

According to one particular embodiment of the invention, the steps of the encoding method are implemented by computer program instructions. To this end, the encoding device COD has the classic architecture of a computer and comprises especially a memory MEM, a processing unit UT, equipped for example with a microprocessor PROC, and managed by the computer program PG stored in the memory MEM. The computer program PG comprises instructions to implement the steps of the encoding method as described here above, when the program is executed by the processor PROC.

At initialization, the code instructions of the computer program PG are for example loaded into a memory RAM and then executed by the processor PROC. The processor PROC of the processing unit UT especially implements the steps of the encoding method described here above, according to the instructions of the computer program PG.

According to another embodiment of the invention, the encoding method is implemented by functional modules. To this end, the encoding method COD furthermore comprises:
 an obtaining module OBT to obtain, for each available prediction mode to predict said current block, a predictive block associated with the available prediction mode,
 a building module COS to build a list comprising at least one of the two prediction modes available,
 a determining module DET to determine a measurement of distance between the predictive block associated with the prediction mode included in the list and the other predictive blocks obtained,
 a modification module MOD to modify said list as a function of said determined measurement of distance,
 a selection module SEL to select, from the modified list, a prediction mode to encode the current block,
 an encoding module for the encoding, in the data stream, of a piece of information identifying, for said current block, said prediction module selected in the modified list.

The processing unit UT cooperates with the different functional modules described here above and the memory MEM to implement the steps of the encoding method.

The different functional modules described here above can be in hardware and/or software form. In a software form, such a functional module can include a processor, a memory and program code instructions to implement the function corresponding to the module when the code instructions are executed by the processor. In hardware form, such a functional module can be implemented by any type of adapted encoding circuit such as, for example, and non-restrictively, microprocessors, digital signal processors (DSPs), applications-specific integrated circuits (ASICs), field programmable gate arrays (FGPAs) and logic unit wiring.

5.6 Decoding Device

FIG. 6 presents the simplified structure of a decoding device DEC adapted to implementing the method of decoding according to any one of the particular embodiments of the invention. The decoding device DEC is adapted to decoding a stream of encoded data representing at least one image, said image being subdivided into blocks, at least two prediction modes being available to predict a block, called a current block, of the image. The decoding device DEC is especially configured to:
 obtain, for each prediction mode available to predict the current block, a predictive block associated with the available prediction mode,
 build a list comprising at least one of the two available prediction modes,
 for at least one prediction mode included in said list, called a current mode:
  determine a measurement of distance between the predictive block associated with said current mode and the other predictive blocks obtained,
  modify said list as a function of said determined measurement of distance,
 decode from the list of encoded data, a piece of information identifying, for said current block, a prediction mode from the modified list,
 rebuild said current block from the predictive block associated with said identified prediction mode.

According to one particular embodiment of the invention, the decoding device DEC has the classic architecture of a computer and comprises especially a memory MEMO, a processing unit UTO, equipped for example with a microprocessor PROCO, and managed by the computer program PGO stored in the memory MEMO. The computer program PGO comprises instructions to implement the steps of the encoding method as described here above, when the program is executed by the processor PROCO.

At initialization, the code instructions of the computer program PGO are for example loaded into a memory RAM and then executed by the processor PROCO. The processor PROCO of the processing unit UTO especially implements the steps of the encoding method described here above, according to the instructions of the computer program PGO.

According to another particular embodiment of the invention, the decoding method is implemented by functional modules. To this end, the decoding device DEC furthermore comprises:
- an obtaining module OBTO to obtain, for each prediction mode available to predict the current block, a predictive block associated with the available prediction mode,
- a building module COSO to build a list comprising at least one of the two prediction modes available,
- a determining module DETO to determine a measurement of distance between the predictive block associated with a prediction mode included in said list and the other predictive blocks obtained,
- a modification module MODO to modify said list as a function of said determined measurement of distance,
- a decoding module DC to decode, from the encoded data stream, a piece of information identifying, for said current block, a prediction mode from the modified list,
- a rebuilding mode RC to rebuild said current block from the predictive block associated with said identified prediction mode.

The processing unit UTO cooperates with the different functional modules described here above and the memory MEMO in order to implement the steps of the decoding method.

The different functional modules described here above can be in hardware and/or software form. In a software form, such a functional module can include a processor, a memory and program code instructions to implement the function corresponding to the module when the code instructions are executed by the processor. In hardware form, such a functional module can be implemented by any type of adapted encoding circuit such as, for example, and non-restrictively, microprocessors, digital signal processors (DSPs), applications-specific integrated circuits (ASICs), field programmable gate arrays (FGPAs) and logic unit wiring.

The invention claimed is:

1. A method comprising:
   decoding by a decoding device an encoded data stream representing at least one image, said image being subdivided into blocks, at least two prediction modes being available to predict a block, called a current block, of the image, the decoding comprising, for said current block, the following steps:
   for each prediction mode available for predicting said current block, obtaining a predictive block associated with the available prediction mode,
   building a list comprising at least one of the at least two available prediction modes,
   for each prediction mode included in said list, called a current mode:
   determining measurements of distance between the predictive block associated with said current mode and each of the other predictive blocks associated with the other available prediction modes and obtained for said current block,
   modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list,
   decoding, from the stream of encoded blocks, a piece of information identifying, for said current block, a prediction mode from the modified list, and
   rebuilding said current block from the predictive block associated with said identified prediction mode.

2. A method comprising:
   encoding, by an encoding device, at least one image in the form of a stream of encoded data, said image being subdivided into blocks, at least two prediction modes being available to predict a block of said image, called a current block, the encoding comprising the following steps, for said current block:
   for each prediction mode available for predicting said current block, obtaining a predictive block associated with the available prediction mode,
   building a list comprising at least one of the at least two available prediction modes,
   for each prediction mode included in said list, called a current mode:
   determining measurements of distance between the predictive block associated with said current mode and each of the other predictive blocks associated with the other available prediction modes and obtained for said current block,
   modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list,
   selecting, from the modified list, a prediction mode to encode the current block, and
   encoding, in the stream of encoded data, a piece of information identifying, for said current block, said prediction mode selected in the modified list.

3. The method according to claim 2, wherein the other available prediction mode is not included in said list.

4. The method according to claim 2, wherein the measurement of distance for a first predictive block is determined by a computation of a mean squared error computed between said first predictive block and a second predictive block, said first predictive block being similar to said second predictive block when the mean squared error computed is below a predetermined threshold.

5. The method according to claim 4, wherein the predetermined threshold varies with the size of the current block.

6. The method according to claim 2, wherein the steps of determining a measurement of distance of a predictive block, associated with a prediction mode from the list and modifying said list as a function of the determined measurement of distance, are iterated so that the modified list includes a number of prediction modes equal to $2^N$, N being a number of bits on which an index of the list is encoded.

7. The method according to claim 2, wherein the measurement of distance for each prediction mode included in the list is determined by a computation of the energy of the predictive block associated with said prediction mode and obtained for said current mode.

8. The method according to claim 2, wherein the measurement of distance is determined by a computation of the Euclidean distance between the predictive block and another predictive block associated with another prediction mode.

9. The method according to claim 2, wherein a type of modification of the list corresponding to a removal or a re-ordering of the list is determined according to a type of encoding, intra or inter, of said image.

10. A decoding device comprising:
a processor; and
a non-transitory computer-readable medium comprising instructions stored thereon, which when executed by the processor configure the decoding device to perform acts comprising:
decoding an encoded data stream representing at least one image, said image being subdivided into blocks, at least two prediction modes being available to predict a block, called a current block, of the image, the decoding comprising for said current block:
obtaining, for each prediction mode available for predicting said current block, a predictive block associated with the available prediction mode,
building a list comprising at least one of the at least two available prediction modes,
for each prediction mode included in said list, called a current mode:
determining measurements of distance between the predictive block associated with said current mode and each of the other predictive blocks associated with the other available prediction modes and obtained for said current block,
modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list,
decoding, from the stream of encoded blocks, a piece of information identifying, for said current block, a prediction mode from the modified list, and
rebuilding said current block from the predictive block associated with said identified prediction mode.

11. An encoding device comprising:
a processor; and
a non-transitory computer-readable medium comprising instructions stored thereon, which when executed by the processor configure the encoding device to perform acts comprising:
encoding at least one image in the form of a stream of encoded data, said image being subdivided into blocks, at least two prediction modes being available to predict a block of said image, called a current block, the encoding comprising, for said current block:
obtaining, for each prediction mode available for predicting said current block, a predictive block associated with the available prediction mode,
building a list comprising one of the at least two available prediction modes,
for each prediction mode included in said list, called a current mode:
determining measurements of distance between the predictive block associated with said current mode and each of the other predictive blocks associated with the other available prediction modes and obtained for said current block,
modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list,
selecting, from the modified list, a prediction mode to encode the current block, and
encoding, in the stream of encoded data, a piece of information identifying, for said current block, said prediction mode selected in the modified list.

12. A non-transitory computer-readable medium comprising instructions stored thereon, which when executed by a processor of a decoding device configure the decoding device to perform acts comprising:
decoding by the decoding device an encoded data stream representing at least one image, said image being subdivided into blocks, at least two prediction modes being available to predict a block, called a current block, of the image, the decoding comprising, for said current block, the following steps:
for each prediction mode available for predicting said current block, obtaining a predictive block associated with the available prediction mode,
building a list comprising at least one of the at least two available prediction modes,
for each prediction mode included in said list, called a current mode:
determining measurements of distance between the predictive block associated with said current mode and each of the other predictive blocks associated with the other available prediction modes and obtained for said current block,
modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list,
decoding, from the stream of encoded blocks, a piece of information identifying, for said current block, a prediction mode from the modified list, and
rebuilding said current block from the predictive block associated with said identified prediction mode.

13. A non-transitory computer-readable medium comprising instructions stored thereon, which when executed by a processor of an encoding device configure the encoding device to perform acts comprising:

encoding at least one image in the form of a stream of encoded data, said image being subdivided into blocks, at least two prediction modes being available to predict a block of said image, called a current block, the encoding comprising the following steps, for said current block:

for each prediction mode available for predicting said current block, obtaining a predictive block associated with the available prediction mode, building a list comprising at least one of the at least two available prediction modes, for each prediction mode included in said list, called a current mode:

determining measurements of distance between the predictive block associated with said current mode and each of the other predictive blocks associated with the other available prediction modes and obtained for said current block, modifying said list as a function of said determined measurements of distance including removing said current mode from said list when the determined measurement of distance indicates that the predictive block associated with said current mode comprised in the list is similar to a predictive block associated with another available prediction mode, or re-ordering the list in descending order of the measurement of distances determined for each prediction mode of the list, selecting, from the modified list, a prediction mode to encode the current block, and encoding, in the stream of encoded data, a piece of information identifying, for said current block, said prediction mode selected in the modified list.

14. The method of claim 1, wherein the distance between the predictive block associated with said current mode and the other predictive blocks associated with the other available prediction modes comprises a distance between content of the predictive block associated with said current mode and content of each of the other predictive blocks associated with the other available prediction modes.

15. The method of claim 2, wherein the distance between the predictive block associated with said current mode and the other predictive blocks associated with the other available prediction modes comprises a distance between content of the predictive block associated with said current mode and content of each of the other predictive blocks associated with the other available prediction modes.

16. The device of claim 10, wherein the distance between the predictive block associated with said current mode and the other predictive blocks associated with the other available prediction modes comprises a distance between content of the predictive block associated with said current mode and content of each of the other predictive blocks associated with the other available prediction modes.

17. The device of claim 11, wherein the distance between the predictive block associated with said current mode and the other predictive blocks associated with the other available prediction modes comprises a distance between content of the predictive block associated with said current mode and content of each of the other predictive blocks associated with the other available prediction modes.

18. The computer-readable medium of claim 12, wherein the distance between the predictive block associated with said current mode and the other predictive blocks associated with the other available prediction modes comprises a distance between content of the predictive block associated with said current mode and content of each of the other predictive blocks associated with the other available prediction modes.

19. The computer-readable medium of claim 13, wherein the distance between the predictive block associated with said current mode and the other predictive blocks associated with the other available prediction modes comprises a distance between content of the predictive block associated with said current mode and content of each of the other predictive blocks associated with the other available prediction modes.

\* \* \* \* \*